United States Patent
Huntwork et al.

(10) Patent No.: US 9,313,187 B1
(45) Date of Patent: Apr. 12, 2016

(54) NETWORK SITE CUSTOMIZATION USING PROXIES

(75) Inventors: Andrew S. Huntwork, Tempe, AZ (US); Jeremy Boynes, Mercer Island, WA (US); Benjamin Elliott Pew, Seattle, WA (US); Shashank Shekhar, Andhra Pradesh (IN); Anna Catherine Bell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 906 days.

(21) Appl. No.: 12/943,130

(22) Filed: Nov. 10, 2010

(51) Int. Cl.
| | |
|---|---|
| G06F 7/04 | (2006.01) |
| G06F 17/00 | (2006.01) |
| G06F 12/14 | (2006.01) |
| G06F 15/16 | (2006.01) |
| H04L 29/06 | (2006.01) |
| H04L 29/08 | (2006.01) |

(52) U.S. Cl.
CPC ........... *H04L 63/08* (2013.01); *H04L 29/08576* (2013.01)

(58) Field of Classification Search
CPC . H04L 67/2814; H04L 63/08; H04L 63/0281; H04L 63/1416; H04L 63/1408; H04L 29/08576; H04L 29/12066; H04L 61/1511
USPC ............................ 709/245, 228; 726/4, 12, 22
See application file for complete search history.

(56) References Cited

U.S. PATENT DOCUMENTS

| | | | | |
|---|---|---|---|---|
| 6,182,226 | B1 * | 1/2001 | Reid et al. | 726/15 |
| 6,490,602 | B1 * | 12/2002 | Kraemer | 715/236 |
| 6,741,853 | B1 * | 5/2004 | Jiang et al. | 455/418 |
| 7,058,699 | B1 * | 6/2006 | Chiou et al. | 709/219 |
| 7,159,180 | B2 * | 1/2007 | Ward | 715/744 |
| 7,680,785 | B2 * | 3/2010 | Najork | 707/999.005 |
| 2002/0095387 | A1 * | 7/2002 | Sosa et al. | 705/65 |
| 2004/0143600 | A1 * | 7/2004 | Musgrove et al. | 707/104.1 |
| 2008/0263135 | A1 * | 10/2008 | Olliphant | 709/203 |

OTHER PUBLICATIONS

Parr, Facebook credits, Apr. 2009, Retrieved From the Internet <URL: mashable.com/2009/04/04/facebook-credits/>, pp. 1-3 as printed.*

Pattison, How to Market Your Business With Facebook, Nov. 2009, Retrieved from the Internet <URL:nytimes.com/2009/11/12/business/smallbusiness/12guide.html>, pp. 1-4 as printed.*

(Continued)

*Primary Examiner* — Aravind Moorthy
(74) *Attorney, Agent, or Firm* — Thomas Horstemeyer, LLP

(57) ABSTRACT

Disclosed are various embodiments for network site customization using proxy server applications. A first request is obtained from an administrator of a network site to configure a proxy server application to obtain one or more network pages associated with a first portion of the network site from a first application executed in one or more computing devices. The proxy server application is configured in accordance with the first request. A second request is obtained from the administrator to reconfigure the proxy server application to obtain the one or more network pages from a second application executed in one or more computing devices. The network site includes one of several network sites hosted at least in part through the second application. The proxy server application is reconfigured in accordance with the second request.

25 Claims, 6 Drawing Sheets

(56) References Cited

OTHER PUBLICATIONS

Geochet, Facebook Post Link Image, Apr. 2010, Retrieved from the Internet <URL:stackoverflow.com/questions/1079599/facebook-post-link-image>, pp. 1-5 as printed.*

(no stated author), Sun Java Systgem Web Proxy Server 4.0.13 Administration Guide, Sep. 2009, Retrieved from the Internet <URL: docs.oracle.com/cd/E19438-01/821-1324/fxjbo/index.html>, pp. 1-388 as printed.*

Bauer, Building Secure Servers with Linux, chapter 2, Nov. 2002, Retrieved from the Internet <URL:eduunix.ccut.edu.cn/...ex2/html/linux/O'Reilly%20-%20Building.Secure%20Servers%20with%20Linux/bssrvrlnx-CHP-2-SECT-2.html>, pp. 1-9 as printed.*

Sharon et al., url without file name, Mar. 2010, Retrieved from the Internet <URL:stackoverflow.com/questions/2444802/url-without-file-name>, pp. 1-4 as printed.*

No stated author; Managing Your Domain Names; 2008; GoDaddy; Retrieved from the Internet <URL:web.archive.org/web/20090205224831/http://products.secureserver.net/guides/managingdomains.pdf>; pp. 1-18.*

No stated author; Go Daddy Marketplace; May 2010; GoDaddy; Retrieved from the Internet <URL:products.secureserver.net/guides/marketplace_guide.pdf>; pp. 1-19 as printed.*

No stated author; Creating and Forwarding a Subdomain; Oct. 2008; Retrieved from the Internet <URL:web.archive.org/web/20090207020407/http://help.godaddy.com/topic/163/article/415>; p. 1.*

No stated author; The Apache Tomcat Connector—Generic HowTo—Reverse Proxy HowTo; Dec. 2009; Retrieved from the Internet <URL: web.archive.org/web/20091226190555/http://tomcat.apache.org/connectors-doc/generic_howto/proxy.html>; pp. 1-7 as printed.*

Tallamy, Stephen; Amazon Web Services: Clouded by Duplicate Content; Jun. 2010; Retrieved from the Internet <URL: moz.com/blog/amazon-web-services-creator-of-mass-duplicate-content>; pp. 1-28 as printed.*

U.S. Appl. No. 12/943,127, filed Nov. 10, 2010 for "Separating Control of Network Sites".

U.S. Appl. No. 12/943,132, filed Nov. 10, 2010 for "Executing Untrusted Content in a Trusted Network".

* cited by examiner

NETWORK SITE CUSTOMIZATION USING PROXIES

CROSS REFERENCE TO RELATED APPLICATIONS

The following application is related to co-pending U.S. Patent Application entitled "SEPARATING CONTROL OF NETWORK SITES" filed on even date herewith and issued as U.S. Pat. No. 8,666,828, and to co-pending U.S. Patent Application entitled "EXECUTING UNTRUSTED CONTENT IN A TRUSTED NETWORK" filed on even date herewith and issued as U.S. Pat. No. 8,892,754, which are incorporated herein by reference in their entirety.

BACKGROUND

Compliance with Payment Card Industry Data Security Standards (PCI DSS) and/or other security standards may present challenges for online merchants. For this and other reasons, online merchants may elect to have their electronic commerce platform managed by a third-party electronic commerce hosting provider who ensures compliance with the security standards. However, merchants may lose flexibility in customizing or configuring their network sites when using such a hosted solution as compared with a self-managed solution.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to separating control of network sites using proxy server applications. Network sites handling electronic commerce may be subjected to various security standards, and compliance with the standards may be burdensome. Electronic marketplaces and/or other providers of managed services may restrict the ability of merchants to control and/or customize their hosted network sites in order to ensure compliance with the security standards. Various embodiments of the present disclosure enable merchants on such hosted electronic commerce platforms to designate portions of their network sites to be self-managed. The separation of control may be accomplished by using a proxy server application. Also, by employing a proxy server application, an administrator of a network site may be able to move hosting of a network site from one provider or platform to another in a simplified way. Furthermore, various embodiments of the present disclosure use proxy server applications external to a trusted network in order to prevent unauthorized access of content within the trusted network. In the following discussion, a general description of the system and its components is provided, followed by a discussion of the operation of the same.

Figure 1:
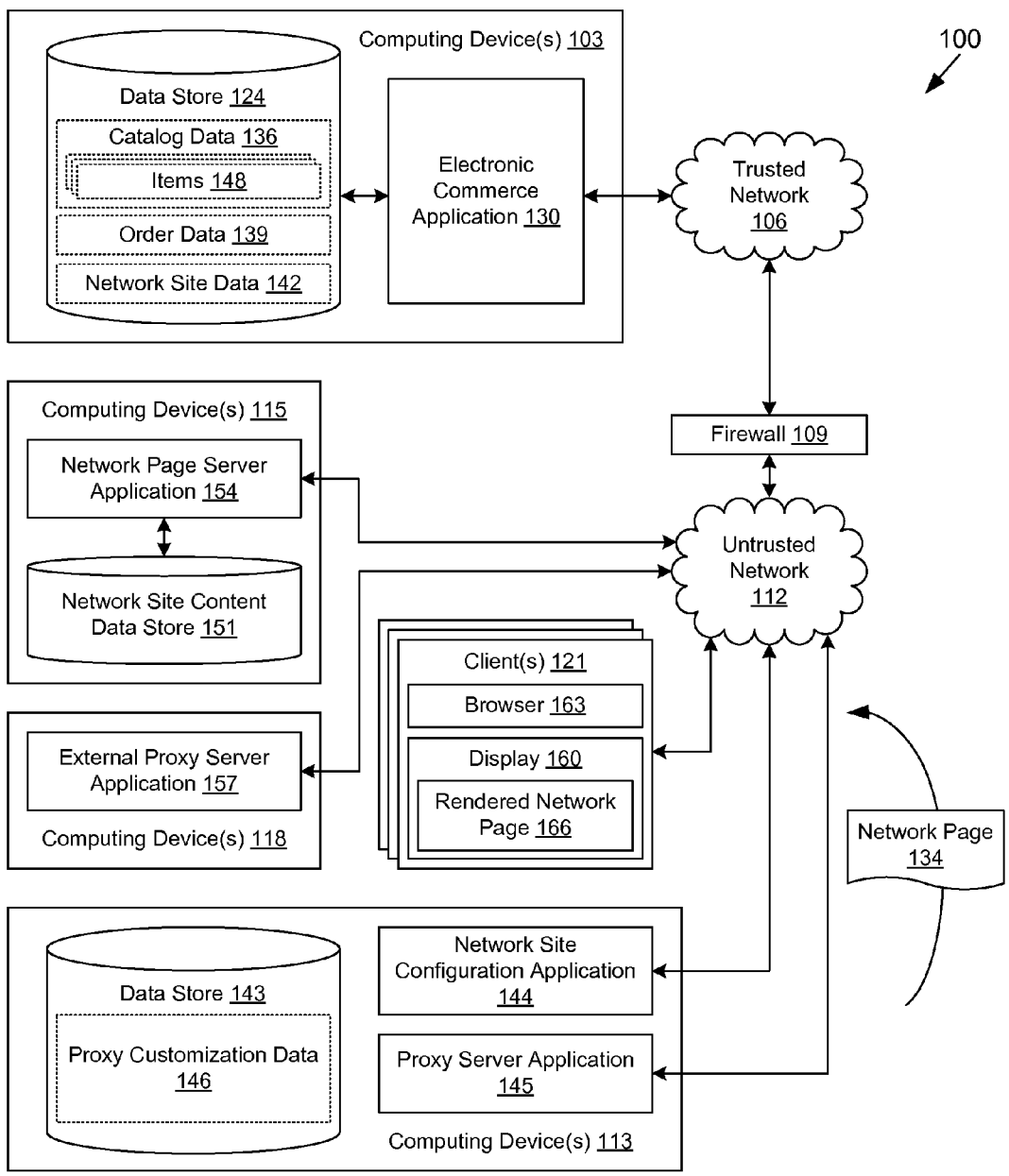
FIG. 1 is a drawing of a networked environment according to various embodiments of the present disclosure.

With reference to FIG. 1, shown is a networked environment 100 according to various embodiments. The networked environment 100 includes one or more computing devices 103 coupled to a trusted network 106. The trusted network 106 includes, for example, intranets, wide area networks (WANs), local area networks (LANs), wired networks, wireless networks, or other suitable networks, etc., or any combination of two or more such networks. In various embodiments, the trusted network 106 may comprise a network controlled by an organization that maintains compliance with the Payment Card Industry Data Security Standards (PCI DSS) and/or other security standards. In one embodiment, the trusted network 106 may comprise an internet protocol (IP) subnetwork using a private address range.

The trusted network 106 may be behind a firewall 109 that separates the trusted network 106 from an untrusted network 112. In various embodiments, the firewall 109 may comprise a network-layer device, a transport-layer device, and/or another type of network device. The untrusted network 112 includes, for example, the Internet, intranets, extranets, wide area networks (WANs), local area networks (LANs), wired networks, wireless networks, or other suitable networks, etc., or any combination of two or more such networks. Although the untrusted network 112 may include the Internet and may not comply with PCI DSS and/or other security standards, it is understood that portions of the untrusted network 112 may be compliant with PCI DSS and/or other security standards. In various embodiments, one or more computing devices 113, one or more computing devices 115, one or more computing devices 118, and/or one or more clients 121, among other devices, may be coupled to the untrusted network 112.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

In some embodiments, all of the computing devices 103 may be managed by a single entity for purposes of security standard compliance.

Various applications and/or other functionality may be executed in the computing device 103 according to various embodiments. Also, various data is stored in a data store 124 that is accessible to the computing device 103. The data store 124 may be representative of a plurality of data stores 124 as can be appreciated. The data stored in the data store 124, for example, is associated with the operation of the various applications and/or functional entities described below.

The components executed on the computing device 103, for example, include an electronic commerce application 130 and other applications, services, processes, systems, engines, or functionality not discussed in detail herein. The electronic commerce application 130 is executed in order to facilitate the online purchase of items from any of a plurality of online merchants over the untrusted network 112. The electronic commerce application 130 also performs various backend functions associated with the online presence of the merchants in order to facilitate the online purchase of items. Although the electronic commerce application 130 may host a portion of an online presence of a merchant, a merchant may also have other portions of its online presence in social networking sites, blog sites, and so on.

The electronic commerce application 130 may generate network pages 134 such as, for example, web pages and/or other types of network content that may be provided to clients 121 for the purposes of selecting items for purchase, rental, download, lease, and/or other forms of consumption. The network pages 134 may comprise hypertext markup language (HTML), extensible markup language (XML), JavaScript®, and/or other code along with text, images, audio, video, and/or other multimedia. In various embodiments, the electronic commerce application 130 may include a commercially available network page server application such as, for example, Apache® HTTP Server, Apache® Tomcat®, Microsoft® Internet Information Services (IIS), etc.

Although many examples given herein relate to merchants and electronic commerce, it is understood that the principles described herein may apply, for example, to any application managed by an organization that has a plurality of customers. As a non-limiting example, an organization may manage a healthcare application that maintains patient records. Various medical groups and/or physicians may be customers of the organization and may manage their patient records by way of the hosted healthcare application.

The data stored in the data store 124 may include, for example, catalog data 136, order data 139, network site data 142, and potentially other data. The catalog data 136 includes a listing of items 148. An item 148 may include any good, product, service, software item, multimedia item, or other item that may be offered for sale, purchase, download, lease, or any other form of consumption as can be appreciated. Each item 148 may include various data such as, for example, title, description, price, weight, customer reviews, categories, quantities, conditions, options, and/or other data.

The order data 139 includes data relating to orders for items 148 placed through the electronic commerce application 130. In various embodiments, the order data 139 may include sensitive data regarding customers, including, for example, contact information, electronic payment information, date of birth, identification information (e.g., Social Security numbers, driver's license numbers, etc.), and/or other data. PCI DSS and/or other security standards may impose rules that govern the storage and use of information in the order data 139. For example, a security standard may require that a credit card number be stored in an encrypted format in a different computing device 103 from a verification code for the credit card number.

The network site data 142 may include various data used in generating network pages 134 associated with network sites of merchants hosted by the electronic commerce application 130. To this end, the network site data 142 may include various customizations of the merchants for their respective network sites. In one embodiment, the customizations stored in the network site data 142 may be subjected to a manual review for compliance with PCI DSS and/or other data security standards. As non-limiting examples, the network site data 142 may include graphics, images, templates, code, video, audio, multimedia, static network pages 134, and/or other data.

The computing device 113 may comprise, for example, a server computer or any other system providing computing capability. Alternatively, a plurality of computing devices 113 may be employed that are arranged, for example, in one or more server banks or computer banks or other arrangements. For example, a plurality of computing devices 113 together may comprise a cloud computing resource, a grid computing resource, and/or any other distributed computing arrangement. Such computing devices 113 may be located in a single installation or may be distributed among many different geographical locations. For purposes of convenience, the computing device 113 is referred to herein in the singular. Even though the computing device 113 is referred to in the singular, it is understood that a plurality of computing devices 113 may be employed in the various arrangements as described above. In some embodiments, all of the computing devices 113 may be managed by a single entity for purposes of security standard compliance.

Various applications and/or other functionality may be executed in the computing device 113 according to various embodiments. Also, various data is stored in a data store 143 that is accessible to the computing device 113. The data store 143 may be representative of a plurality of data stores 143 as can be appreciated. The data stored in the data store 143, for example, is associated with the operation of the various applications and/or functional entities described below.

The components executed on the computing device 113, for example, include a network site configuration application 144, a proxy server application 145, and other applications, services, processes, systems, engines, or functionality not discussed in detail herein. The network site configuration application 144 is executed to configure how a network site is served up by the proxy server application 145. For example, the network site configuration application 144 may enable a user to configure one portion of a network site to be served up by a first server application and another portion of the same network site to be served up by a second server application.

The proxy server application 145 comprises an application-layer proxy service that receives requests for a resource, requests and obtains the resource from another application, and returns the resource. Such a resource may comprise a network page 134. In one embodiment, the proxy server application 145 comprises a hypertext transfer protocol (HTTP) proxy service. In various embodiments, the proxy server application 145 may be considered to be a transparent reverse proxy. As will be further described herein, the proxy server application 145 may be configured to obtain one portion of a network site from an application that is trusted to comply with certain security standards and another portion of the network site from another application that is not similarly trusted. In various embodiments using an elastic computing platform, the proxy server application 145 may be configured to scale automatically to allocate more computing resources in the computing device 113 as needed.

As shown in FIG. 1, the proxy server application 145 may be executed in a computing device 113 coupled to the untrusted network 112. In other embodiments, the proxy server application 145 may execute in a computing device 103 coupled to the trusted network 106. In one embodiment, the proxy server application 145 may be executed in a computing device 113 within a demilitarized zone, or a quarantined portion, of the trusted network 106 that prevents the proxy server application 145 from accessing restricted resources of the trusted network 106.

The data stored in the data store 143 may include, for example, proxy customization data 146 and potentially other data. The proxy customization data 146 includes configuration parameters and/or other settings for the configuration of the proxy server application 145. In various embodiments, some or all parameters may be configured by merchant administrative users. The proxy customization data 146 may control a partitioning of a network site such that one portion of the site is served up by the electronic commerce application 130, while another portion of the site is served up by some other application. In some instances, the proxy customization data 146 may specify that the entirety of the network site may be served up by one application. The proxy customization data 146 may also be used to control mapping of individual requested resource identifiers to actual resource identifiers. In one embodiment, such resource identifiers comprise uniform resource locators (URLs).

The computing device 115 may comprise, for example, a server computer or any other system providing computing capability. Alternatively, a plurality of computing devices 115 may be employed that are arranged, for example, in one or more server banks or computer banks or other arrangements. For example, a plurality of computing devices 115 together may comprise a cloud computing resource, a grid computing resource, and/or any other distributed computing arrangement. Such computing devices 115 may be located in a single installation or may be distributed among many different geographical locations. For purposes of convenience, the computing device 115 is referred to herein in the singular. Even though the computing device 115 is referred to in the singular, it is understood that a plurality of computing devices 115 may be employed in the various arrangements as described above. In one embodiment, the computing device 115 may be under the control of a merchant or other user of the electronic commerce application 130, while in another embodiment, the computing device 115 may be under the control of a hosting provider such as, for example, the hosting provider responsible for the computing device 103.

Various applications and/or other functionality may be executed in the computing device 115 according to various embodiments. Also, various data is stored in a network site content data store 151 that is accessible to the computing device 115. The network site content data store 151 may be representative of a plurality of data stores as can be appreciated. The data stored in the network site content data store 151, for example, is associated with the operation of the various applications and/or functional entities described below.

The components executed on the computing device 115, for example, include a network page server application 154 and other applications, services, processes, systems, engines, or functionality not discussed in detail herein. The network page server application 154 is executed to serve up network pages 134 and/or other forms of network site content from the network site content data store 151. In one embodiment, the network pages 134 served up by the network page server application 154 are fully managed by an administrative user associated with a merchant. In various embodiments, the network page server application 154 and the computing device 115 may be compliant with PCI DSS and/or other security standards. In one embodiment, the network page server application 154 comprises an electronic commerce application, which may be the same as or different from the electronic commerce application 130 executed in the computing device 103. In various embodiments, the network page server application 154 may include a commercially available network page server application such as, for example, Apache® HTTP Server, Apache® Tomcat®, Microsoft® Internet Information Services (IIS), etc.

The computing device 118 may comprise, for example, a server computer or any other system providing computing capability. Alternatively, a plurality of computing devices 118 may be employed that are arranged, for example, in one or more server banks or computer banks or other arrangements. For example, a plurality of computing devices 118 together may comprise a cloud computing resource, a grid computing resource, and/or any other distributed computing arrangement. Such computing devices 118 may be located in a single installation or may be distributed among many different geographical locations. For purposes of convenience, the computing device 118 is referred to herein in the singular. Even though the computing device 118 is referred to in the singular, it is understood that a plurality of computing devices 118 may be employed in the various arrangements as described above. In one embodiment, the computing device 118 may be under the control of the same hosting provider as the computing device 103 even though the computing device 118 is separated from the trusted network 106 by the firewall 109.

Various applications and/or other functionality may be executed in the computing device 118 according to various embodiments. The components executed on the computing device 118, for example, include an external proxy server application 157 and other applications, services, processes, systems, engines, or functionality not discussed in detail herein. The external proxy server application 157 comprises an application-layer proxy service that receives requests for a resource, requests and obtains the resource from another application, and returns the resource. Such a resource may comprise a network page 134. In one embodiment, the external proxy server application 157 comprises a hypertext transfer protocol (HTTP) proxy service. Because the external proxy server application 157 is separated from the resources on the trusted network 106 by the firewall 109, the external proxy server application 157 has an external view of the trusted network 106 and cannot gain access to restricted resources on the trusted network 106 that are protected by the firewall 109.

The client 121 is representative of a plurality of client devices that may be coupled to the untrusted network 112. The client 121 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 121 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 121 may be configured to execute various applications such as a browser 163 and/or other applications. The browser 163 may be executed in a client 121, for example, to access and render network pages 134, such as web pages, or other network content served up by the computing device 103 and/or other servers, thereby generating a rendered network page 166 on the display 160. The client 121 may be configured to execute applications beyond browser 163 such as, for example, email applications, instant message applications, and/or other applications.

Next, a general description of the operation of the various components of the networked environment 100 is provided. To begin, in a first set of embodiments, control of a network site of a merchant may be separated through the use of the proxy server application 145. When a user at a browser 163 executed in a client 121 sends a request for a network site, the request is received by the proxy server application 145. Network traffic for a domain name associated with the merchant is configured to be sent to the proxy server application 145.

When the request corresponds to a portion of the network site that is not managed by the merchant, the request is forwarded by the proxy server application 145 to the electronic commerce application 130, and the resource is obtained. The resource is then returned to the client 121 over the untrusted network 112. When the request corresponds to a portion of the network site that is managed by the merchant, the request is forwarded by the proxy server application 145 to the network page server application 154 executed in the computing device 118, and the resource is obtained and returned to the client 121 over the untrusted network 112.

The proxy server application 145 may make a decision on where to route the request based in part on a URL embodied in the request, header fields embodied in the request, and/or other data. For example, the proxy server application 145 may make a routing decision based in part on HTTP headers such as a User-Agent field, an Accept field, an Accept-Language field, an Accept-Encoding field, an Accept-Charset field, an Authorization field, a Proxy-Authorization field, a From field, a Referer field, a Host field, and/or other header fields.

It is noted that the electronic commerce application 130 is within the trusted network 106 protected by the firewall 109. The trusted network 106 is under the security supervision of an organization such as a provider of shared electronic commerce hosting. The organization may be responsible for ensuring compliance of the trusted network 106 with PCI DSS and/or other security standards. By contrast, the network page server application 154 is on the untrusted network 112 across the firewall 109, and the same organization supervising security compliance of the trusted network 106 behind the firewall 109 is not responsible for compliance of the network page server application 154 with PCI DSS and/or other security standards. It may be the case that the network page server application 154 is compliant with PCI DSS, etc., but the same organization does not supervise compliance. Consequently, the network page server application 154 is considered untrusted relative to the organization. In some embodiments, the network page server application 154 may be executed in a computing device 103 behind the firewall 109, but the network page server application 154 is still considered untrusted relative to the organization.

By separating control of the network site, a manual review for security compliance of merchant-customized network content is avoided. Typically, the electronic commerce application 130 is configured to accept and process electronic payments and/or other information of a sensitive nature where security standard compliance is especially important. Other content, such as, for example, warranty registration network pages 134, store locator network pages 134, and so on, may be within merchant-controlled accounts such that the network pages 134 are fully customizable or partially customizable by the merchant. The merchant may be able to customize network pages 134 served up through the shared electronic commerce application 130, but customization may be limited and subjected to a manual review by staff of the organization that supervises security compliance of the electronic commerce application 130. Alternatively, customization may be subjected to an automated review by the organization that supervises security compliance of the electronic commerce application 130.

In some embodiments, the network site may be separated by different domain names. For example, a merchant-controlled portion of the network site may correspond to "www.merchantname.site," while a non-merchant controlled portion of the network site may correspond to "secure.merchantname.site." Although the parent domain names may be shared in such subdomains, they may be different in some embodiments. In various embodiments, designated network pages and/or directories of network pages may comprise a portion of the network site that is merchant controlled or not merchant controlled.

In a second set of embodiments, the portions of the network site that are merchant controlled or not merchant controlled may be configured by the merchant. That is, a configuration facility is provided by the network site configuration application 144. To this end, the network site configuration application 144 may be configured to generate and serve up one or more network pages 134 providing user interfaces similar to that which will be discussed in connection with FIG. 2.

Migration of a network site from one provider to another is one area where a proxy server application 145 configured by the merchant can be helpful. A merchant may point its domain name at the proxy server application 145 and configure the proxy server application 145 to respond to requests transparently by obtaining the requested data from the current site platform. Gradually, or all at once, the merchant may configure the proxy server application 145 to respond to requests by obtaining the requested data from a new site platform. However, the change is made transparent to end users, search engine spiders, etc., by mapping the existing set of URLs to potentially different URLs from the new site platform. The URLs may differ not only in the domain name or IP address but also in the filename.

In one embodiment, the existing set of URLs may be automatically learned by the proxy server application 145 by observing requests for URLs of the network site over time. Thus, the existing set of URLs may be presented to an administrative user for mapping to a different set of URLs from the new site platform. In one embodiment, the mapping may be performed in an automated way based at least in part on predefined rules for mapping one electronic commerce platform to another.

The network site configuration application 144 may be configured to enable rollback of a current site configuration to a previous site configuration that is stored within the proxy customization data 146 for the network site. Consequently, if an error occurs when redirecting traffic to a new electronic commerce platform, the previous configuration may quickly be applied. Other than providing an easy way to rollback troublesome changes, using the proxy server application 145 also avoids problems associated with updating the domain name in the domain name system (DNS) such as propagation delays and caching.

In a third set of embodiments, it may be desirable for users to be able to specify remote content to be included within a network page 134 of their network site. As a non-limiting example, a user may specify a URL identifying a resource that is to be included within a network page. As another non-limiting example, a user may configure the proxy server application 145 to obtain and serve up a network page 134 identified by a URL. A security problem may result if the electronic commerce application 130, the proxy server application 145, or any another application that is configured to retrieve the URL has unrestricted access to the resources of the trusted network 106 behind the firewall 109. For example, a malicious user or security exploit may be able to include private documents accessed from inside the trusted network 106 within a network page 134.

To avoid this security problem, an external proxy server application 157 may be employed. The external proxy server application 157 is executed in the computing device 118, which is not within the trusted network 106. Specifically, the computing device 118 is located on the other side of the firewall 109 from the trusted network 106. In various embodiments, the electronic commerce application 130, the proxy server application 145, or any another application that retrieves a user-specified URL may be further configured to retrieve the URL using the external proxy server application 157. The external proxy server application 157, by virtue of having an external view of the trusted network 106, is not permitted access to private documents within the trusted network 106. Consequently, an application executing within the trusted network 106 may avoid accessing private documents by adopting an external view of the trusted network 106 by routing URL requests through the external proxy server application 157.

It may be desirable to restrict access to the external proxy server application 157 to avoid the security problems associated with having an open proxy. An open proxy is a proxy that is configured to obtain resources from any network site when requested by any user. Malicious users may use open proxies to cloak their identity while performing illegal activities. Therefore, it is important to restrict access to the external proxy server application 157. In one embodiment, access to the external proxy server application 157 may be restricted to hosts within the trusted network 106. In another embodiment, access to the external proxy server application 157 may be restricted on an application basis to the electronic commerce application 130, the proxy server application 145, and/or any other application that is configured to obtain resources through the external proxy server application 157. In such an embodiment, the requesting application may be required to authenticate using secure certificates, usernames and passwords, and/or other types of security credentials.

Figure 2:
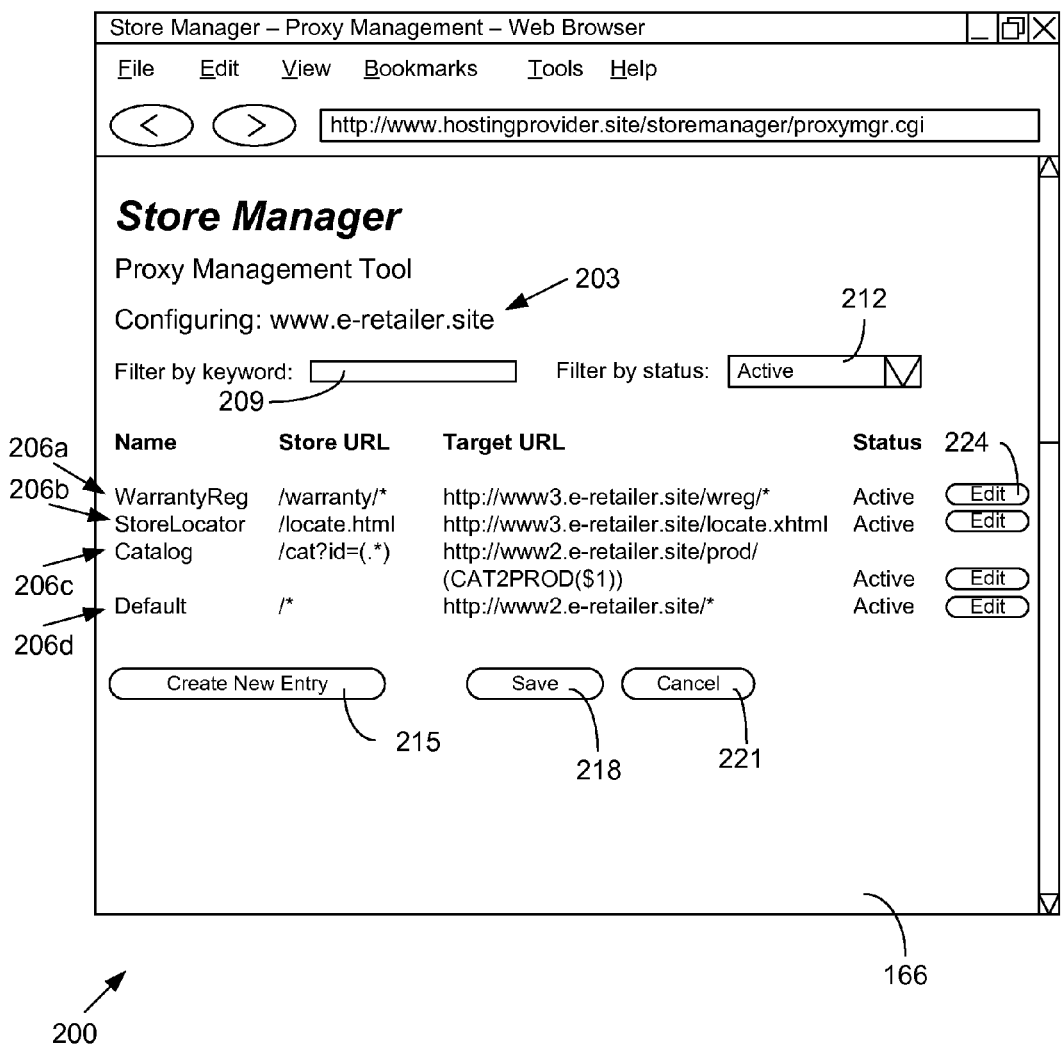
FIG. 2 is a drawing of an example of a user interface rendered by a client in the networked environment of FIG. 1 according to various embodiments of the present disclosure.

Turning next to FIG. 2, shown is an example of a user interface 200 rendered by a browser 163 (FIG. 1) executed in a client 121 (FIG. 1) in the networked environment 100 (FIG. 1). Specifically, the user interface 200 illustrates a rendered network page 166 (FIG. 1) generated by the network site configuration application 144 (FIG. 1) for configuring the operation of the proxy server application 145 (FIG. 1). The rendered network page 166 includes a network site indication 203 that shows that the proxy management tool is presently configuring the network site at the domain name "www.e-retailer.site." The domain name is configured to resolve to an IP address associated with a network interface on which the proxy server application 145 is listening for resource requests.

Various proxy configuration entries 206 are displayed. The proxy configuration entries 206 that are displayed may be filtered by one or more keywords using the keyword filtering tool 209 and/or by status using the status filtering tool 212. The keyword filtering tool 209 may show, for example, only those proxy configuration entries 206 that include the specified keyword in one or more designated fields. The keyword filtering tool 209 may include a text input box, a text area, a drop-down box, and/or other user interface components. The status filtering tool 212 may be used to include the proxy configuration entries 206 that meet one or more selected statuses, such as active, inactive, and so on. The status filtering tool 212 may include radio buttons, a drop-down box, a slider, and/or other user interface components.

A create entry component 215 is provided for creating a new proxy configuration entry 206. A save component 218 is provided in order to save changes to the proxy configuration and to update the proxy customization data 146 (FIG. 1). A cancel component 221 is provided in order to discard the changes to the proxy configuration. Edit components 224 are provided in association with the respective proxy configuration entries 206 for making changes to existing proxy configuration entries. Although the create entry component 215, the save component 218, the cancel component 221, and the edit components 224 are depicted as buttons, it is understood that the same may comprise links and/or other user interface components as desired.

Each of the proxy configuration entries 206 may include fields such as name, store URL, target URL, and a status. The name may specify a friendly name for the resource for purposes of management and tracking. The store URL may correspond to the URL provided by a user at a client 121 within a request for a network page from the network site. The target URL may correspond to a URL of a resource served up by the electronic commerce application 130 (FIG. 1), the network page server application 154 (FIG. 1), and/or another application. The status indicates whether the respective proxy configuration entry 206 is active. Different fields may be included in other embodiments.

The proxy configuration entry 206a corresponds to a warranty registration application hosted by the merchant. When a user requests a network page 134 from the portion of the network site corresponding to URLs matching "/warranty/*," the proxy server application 145 is configured to obtain the resource from the URL "http://www3.e-retailer.site/wreg/*," which may correspond to network resources served up by the network page server application 154 and maintained by the merchant. The "*" occurring the URLs indicates one use of a regular expression for matching that includes a wildcard character. Uniform resource identifier (URI) templates and other forms of pattern matching may be used in some embodiments. It is noted that the URLs may be absolute or relative in various embodiments. The proxy configuration entry 206b corresponds to a store locator function for the merchant. The network page 134 at the URL "/locate.html" is mapped to the URL "http://www3.e-retailer.site/locate.xhtml," which is also managed by the merchant and served up by the network page server application 154.

The proxy configuration entry 206c corresponds to a mapping from one type of a product catalog to another type of a product catalog. URLs that match "/cat?id=(.*)" will be translated into a different format corresponding, for example, to a different electronic commerce platform. Grouping is used within the regular expression to capture the identifier, which may be utilized in the target URL "http://www2.e-retailer.site/prod/CAT2PROD($1))," for example, in the variable "$1." The network site configuration application 127 may provide various functions for use in the translation, such as, for example, data dictionary lookup functions and others. In this case, the function "CAT2PROD( )" is employed to translate a first identifier into a second identifier for use in the target URL. The data dictionary and/or functions may be user defined in some embodiments. The proxy configuration entry 206d corresponds to a default entry to match the rest of the URLs in requests received by the proxy server application 145. The proxy configuration entry 206d specifies that all other URLs are to be served up by "http://www2.e-retailer-site/*," which corresponds to the electronic commerce application 130 hosted by an electronic commerce hosting provider.

In one embodiment, the ordering of the proxy configuration entries 206 may be configurable, and the precedence of the proxy configuration entries 206 may be determined through the ordering. In other embodiments, the precedence of the proxy configuration entries 206 may be determined by other rules. In some embodiments, regular expressions may be used merely to determine matching. In other embodiments, regular expressions may be used to define a translation of one URL to another, where extracted portions of a first URL are used in generating a second URL.

Figure 3:
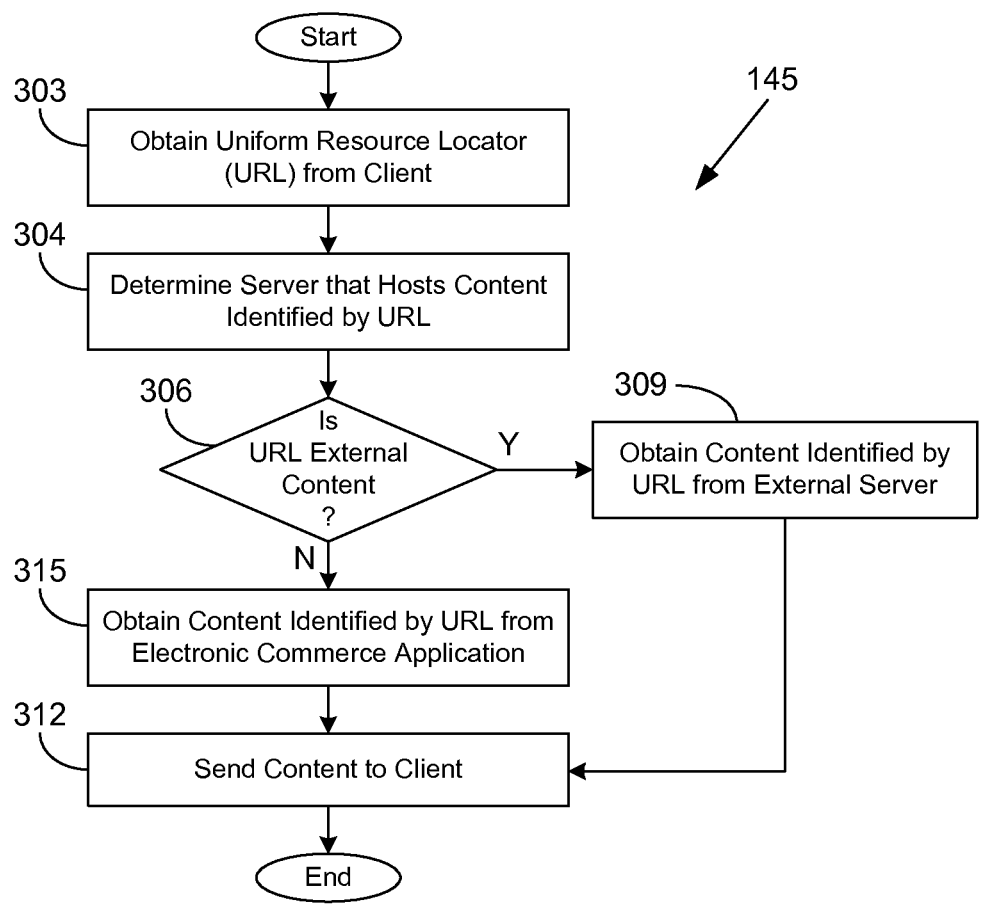
FIG. 3 is a flowchart illustrating one example of functionality implemented as portions of a proxy server application executed in a computing device in the networked environment of FIG. 1 according to various embodiments of the present disclosure.

Referring next to FIG. 3, shown is a flowchart that provides one example of the operation of a portion of the proxy server application 145 according to various embodiments. It is understood that the flowchart of FIG. 3 provides merely an example of the many different types of functional arrangements that may be employed to implement the operation of the portion of the proxy server application 145 as described herein. As an alternative, the flowchart of FIG. 3 may be viewed as depicting an example of steps of a method implemented in the computing device 113 (FIG. 1) according to one or more embodiments.

Beginning with box 303, the proxy server application 145 obtains a URL from a client 121 (FIG. 1). For instance, the client 121 may open up a connection to a network site at a given domain name or IP address. The proxy server application 145 may be configured to listen, for example, at transmission control protocol (TCP) port 80, 443, 8080, or some other port at an IP address to which the network site domain name resolves using the domain name system (DNS). The browser 163 (FIG. 1) at the client 121 may issue an HTTP "GET" request, or another type of request, that includes the URL. The URL may correspond to an absolute URL or a relative URL in various embodiments.

In box 304, the proxy server application 145 determines which server application hosts the content identified by the URL. As an example, the URL may point to content hosted by a server application that is controlled by an organization that is responsible for maintaining security compliance for multiple customers. As another example, the URL may point to content hosted by a server application that is controlled by the owner of the network site.

Next, in box 306, the proxy server application 145 determines whether the URL corresponds to external content. For example, the URL may correspond to a portion of the network site that is managed externally by the owner of the network site, such as, for example, a merchant. The proxy server application 145 may consult the proxy customization data 146 (FIG. 1) to determine whether the obtained URL corresponds to a user-managed portion of the network site or a hosting provider-managed portion of the network site. The URL itself may be mapped to another URL in the proxy customization data 146, or one or more regular expressions may be used to define a mapping of one set of URLs matching the regular expression(s) to another set of URLs.

If the URL corresponds to external content, the proxy server application 145 moves to box 309 and obtains the content identified by the URL from an external server such as the network page server application 154 (FIG. 1) executed in the computing device 115 (FIG. 1). In various embodiments, the external content may be hosted within the computing device 103 in a trusted network 106 (FIG. 1) or within a computing device 115 in an untrusted network 112 (FIG. 1). Where the proxy server application 145 comprises an HTTP proxy service, the proxy server application 145 may open a connection to the computing device 115 at TCP port 80 and issue a "GET" or other HTTP request embodying the URL that corresponds to the external content. The proxy server application 145 may need to authenticate with the network page server application 154 in some embodiments. The network page server application 154 may then accordingly provide the external content over the HTTP connection to the proxy server application 145.

In some embodiments, an encrypted connection such as an HTTP secure (HTTPS) connection employing secure sockets layer (SSL) and/or transport layer security (TLS) may be used. Further, whether an encrypted connection is used may depend on whether the client 121 initiates an encrypted connection. Where an HTTPS connection is used, a different TCP port such as 443 or another port may be used for the server-side ports.

In box 312, the proxy server application 145 sends the external content to the client 121 by way of the previously established HTTP connection, HTTPS connection, or other connection. The content may be sent to the client 121 after being the content has been received or while the content is being received. Thereafter, the portion of the proxy server application 145 ends.

If the proxy server application 145 determines in box 306 that the URL obtained from the client 121 does not correspond to external content, the proxy server application 145 instead proceeds to box 315. As a non-limiting example, the URL may identify trusted content that is controlled or managed by a hosting provider such that compliance with security standards such as PCI DSS is maintained. In box 315, the proxy server application 145 obtains the content identified by the URL from the electronic commerce application 130 (FIG. 1) or some other application. PCI DSS and other security standards are particularly concerned with the security of systems, applications, and data relating to electronic commerce, making it desirable for the electronic commerce application 130 to be provider managed on behalf of one or more merchants.

In one embodiment where the proxy server application 145 comprises an HTTP proxy service, the proxy server application 145 may open a connection to the electronic commerce application 130 at TCP port 80 or another port. The proxy server application 145 may issue a "GET" or other request followed by a URL corresponding to the content available through the electronic commerce application 130. The proxy server application 145 may need to authenticate with the electronic commerce application 130 in some embodiments. Accordingly, the content may be returned by the electronic commerce application 130 to the proxy server application 145 over the HTTP connection. Upon receiving the content, the proxy server application 145 transitions to box 312 and sends the content to the client 121. The content may be sent to the client 121 after the content has been received or while the content is being received. Thereafter, the portion of the proxy server application 145 ends.

Figure 4:
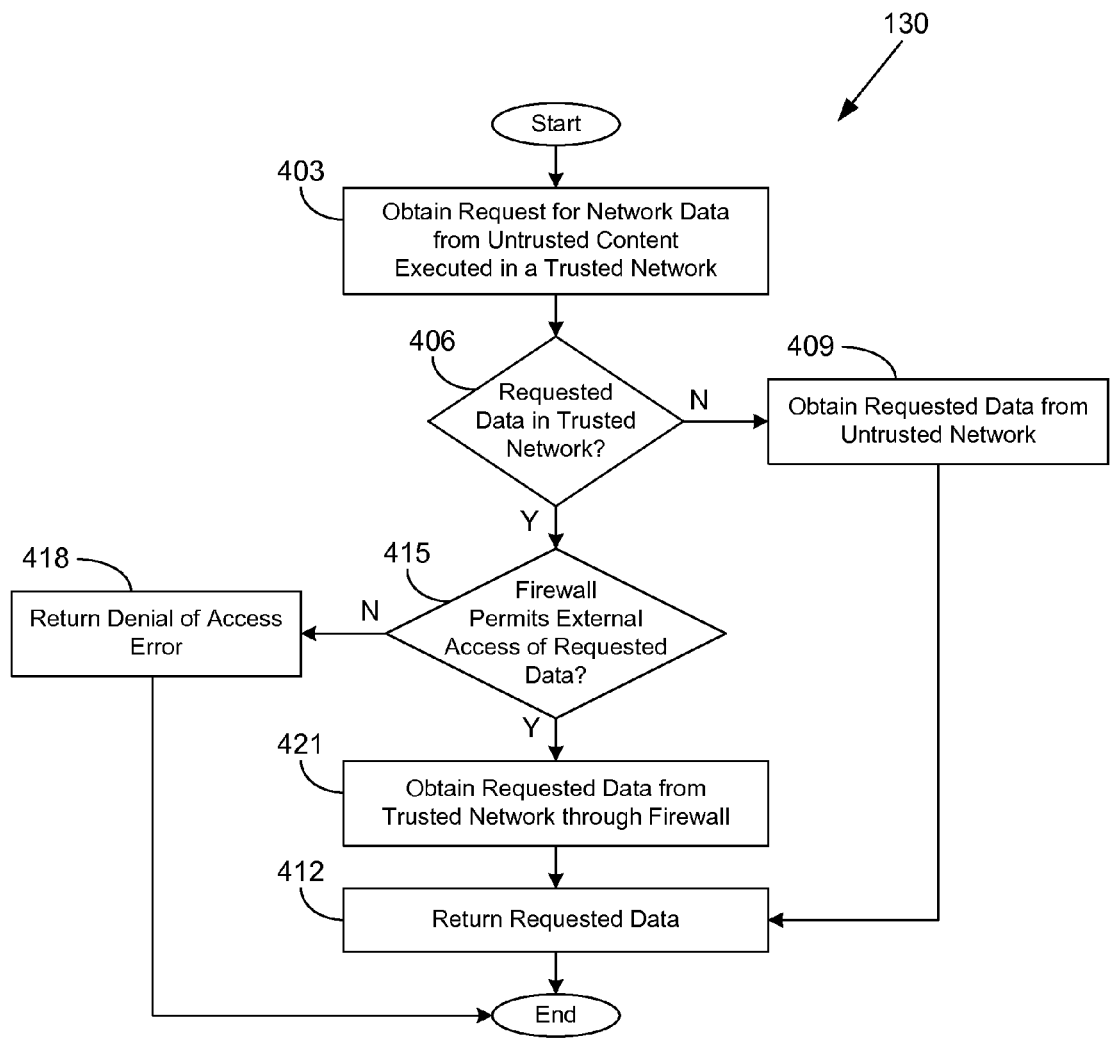
FIG. 4 is a flowchart illustrating one example of functionality implemented as portions of an electronic commerce application executed in a computing device in the networked environment of FIG. 1 according to various embodiments of the present disclosure.

Turning now to FIG. 4, shown is a flowchart that provides one example of the operation of a portion of the electronic commerce application 130 according to various embodiments. Specifically, FIG. 4 illustrates an example of the electronic commerce application 130 functioning in a trusted network 106 (FIG. 1) in conjunction with an external proxy server application 157 (FIG. 1) to request content that is user specified. It is understood that the flowchart of FIG. 4 provides merely an example of the many different types of functional arrangements that may be employed to implement the operation of the portion of the electronic commerce application 130 as described herein. As an alternative, the flowchart of FIG. 4 may be viewed as depicting an example of steps of a method implemented in the computing device 103 (FIG. 1) according to one or more embodiments. It is noted that the functionality depicted in FIG. 4 may additionally or alternatively be implemented by any other application that is configured to generate network pages 134 (FIG. 1).

Beginning with box 403, the electronic commerce application 130 obtains a request for network data from untrusted content executed in a trusted network 106. For example, a merchant-specified URL may be embedded within a network page template that is being processed by the electronic commerce application 130 or another application to generate a network page 134. Because the URL is merchant specified and not manually approved by the electronic commerce hosting provider, the URL comprises untrusted content.

In box 406, the electronic commerce application 130 determines whether the requested data is to be obtained from within the trusted network 106. If the electronic commerce application 130 determines that the requested data is not to be obtained from the trusted network 106, electronic commerce application 130 proceeds to box 409 and obtains the requested data from the untrusted network 112 (FIG. 1). In box 412, the electronic commerce application 130 returns the requested data. Thereafter, the portion of the electronic commerce application 130 ends.

If the proxy server application 145 determines in box 406 that the requested data is within the trusted network 106, the electronic commerce application 130 instead proceeds to box 415. In box 415, the electronic commerce application 130 determines whether the firewall 109 (FIG. 1) permits external access of the requested data by a computing device 118 (FIG. 1) connected to the untrusted network 112. In various embodiments, the electronic commerce application 130 may request the network data from the external proxy server application 157, which has an external view of the trusted network 106.

If the firewall 109 does not permit external access of the requested data, the electronic commerce application 130 moves to box 418 and returns a denial of access error. In such a case, the requested data is restricted from access by the untrusted content. Thereafter, the portion of the electronic commerce application 130 ends.

If the firewall 109 does permit external access of the requested data, the electronic commerce application 130 obtains the requested data from the trusted network 106 through the firewall 109. For example, the requested data may be returned by the external proxy server application 157. In box 412, the electronic commerce application 130 returns the requested data. Thereafter, the portion of the electronic commerce application 130 ends.

Figure 5:
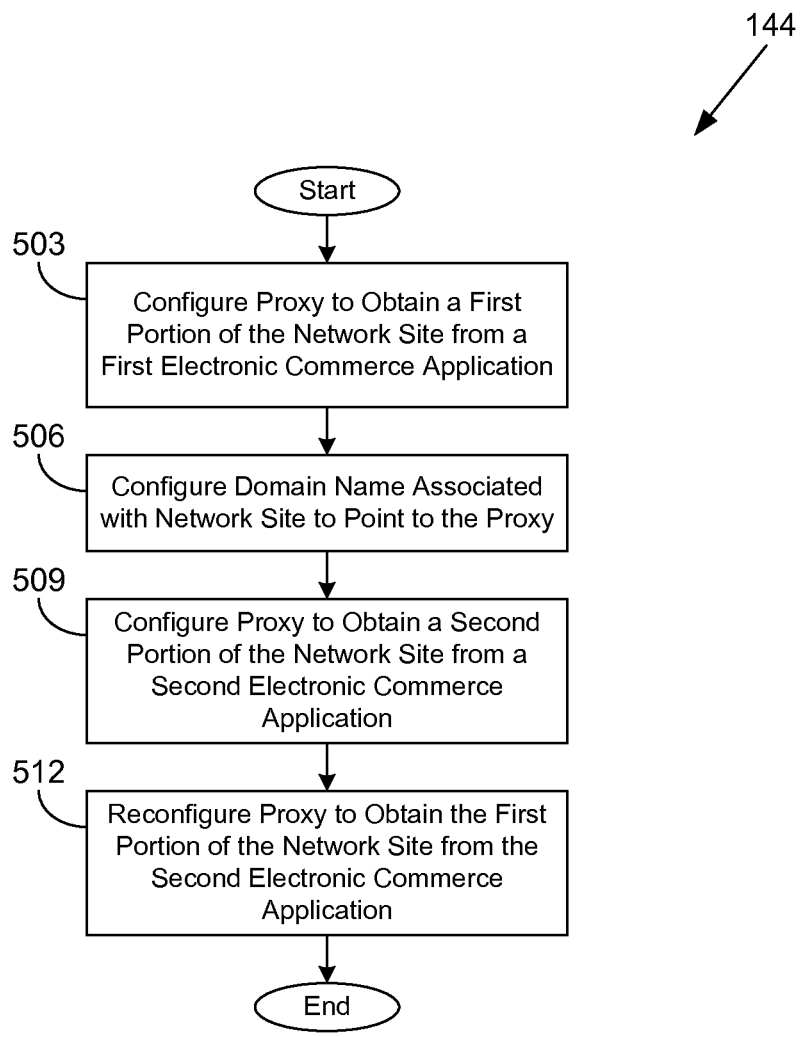
FIG. 5 is a flowchart illustrating one example of functionality implemented as portions of a network site configuration application executed in a computing device in the networked environment of FIG. 1 according to various embodiments of the present disclosure.

Moving on to FIG. 5, shown is a flowchart that provides one example of the operation of a portion of the network site configuration application 144 according to various embodiments. Specifically, FIG. 5 depicts an implementation of a migration of a network site from one electronic commerce platform to another using the network site configuration application 144 to configure a proxy server application 145 (FIG. 1). It is understood that the flowchart of FIG. 5 provides merely an example of the many different types of functional arrangements that may be employed to implement the operation of the portion of the network site configuration application 144 as described herein. As an alternative, the flowchart of FIG. 5 may be viewed as depicting an example of steps of a method implemented in the computing device 113 (FIG. 1) according to one or more embodiments.

Beginning with box 503, the network site configuration application 144 configures the proxy server application 145 to obtain a first portion of the network site from a first electronic commerce application 130 (FIG. 1). In one embodiment, the first electronic commerce application 130 may correspond to a network page server application 154 that is executed in a computing device 115 (FIG. 1). The first portion of the network site may correspond to one or more URLs, which may be defined through the use of one or more regular expressions.

In box 506, the network site configuration application 144 configures the domain name associated with the network site to point to the proxy server application 145. For example, the network site configuration application 144 may configure the DNS zone file for the domain name such that the domain name and/or one or more subdomains of the domain name may point to an IP address associated with the proxy server application 145. Thus, network traffic for the network site will be directed to the proxy server application 145 hosted on the computing device 113.

In box 509, the network site configuration application 144 configures the proxy server application 145 to obtain a second portion of the network site from a second electronic commerce application 130. In one embodiment, the second electronic commerce application 130 is executed in the computing device 103, which may be under the security supervision of a different organization from the computing device 115. Additionally, the second electronic commerce application 130 may correspond to a different electronic commerce platform from the first electronic commerce application 130. In such a case, the proxy server application 145 may be configured to translate URLs corresponding to the first electronic commerce application 130 and platform to the second electronic commerce application 130 and platform. In various site migrations, the site may be completely migrated from one platform to another at once, and the task of box 509 may be omitted.

Next, in box 512, the network site configuration application 144 reconfigures the proxy server application 145 to obtain the first portion of the network site from the second electronic commerce application 130. To this end, the proxy server application 145 may be configured to translate URLs corresponding to the first electronic commerce application 130 and platform to the second electronic commerce application 130 and platform for the first portion of the network site. Thereafter, the migration of the network site is complete and the portion of the network site configuration application 144 ends.

Figure 6:
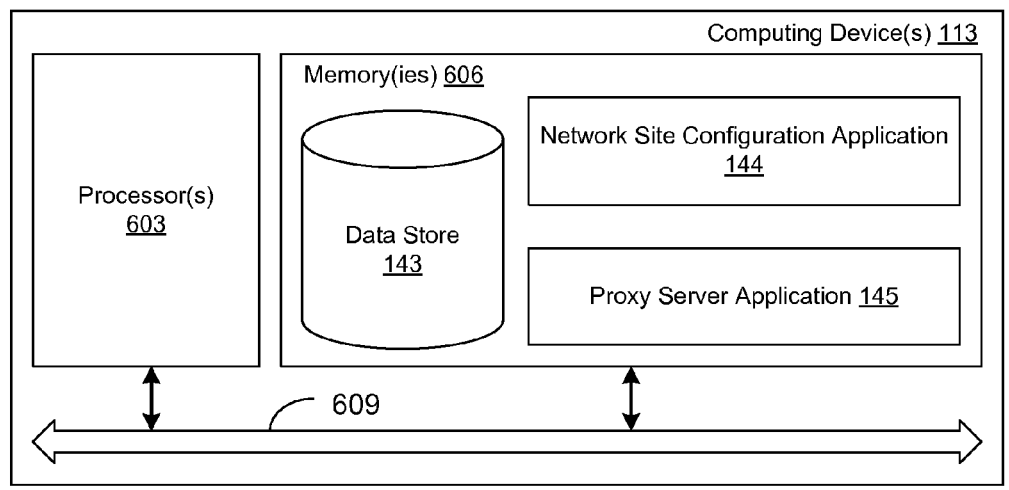
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 113 according to an embodiment of the present disclosure. The computing device 113 includes at least one processor circuit, for example, having a processor 603 and a memory 606, both of which are coupled to a local interface 609. To this end, the computing device 113 may comprise, for example, at least one server computer or like device. The local interface 609 may comprise, for example, a data bus with an accompanying address/control bus or other bus structure as can be appreciated. The computing devices 103, 115 and 118 may be implemented in hardware similarly to the computing device 113 as depicted in FIG. 6.

Stored in the memory 606 are both data and several components that are executable by the processor 603. In particular, stored in the memory 606 and executable by the processor 603 are the network site configuration application 144, the proxy server application 145, and potentially other applications. Also stored in the memory 606 may be a data store 143 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the network site configuration application 144, the electronic commerce application 130, the proxy server application 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the proxy server application 145, the electronic commerce application 130, and the network site configuration application 144. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site configuration application 144, the electronic commerce application 130, and the proxy server application 145, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media.

More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising a plurality of instructions that cause the computing device to at least:
   determine whether a client is authorized to configure a domain name associated with a network site and a proxy server application associated with the network site, wherein the network site is one of a plurality of network sites maintained by the program and individual ones of the plurality of network sites may be exclusively configured by separate ones of a plurality of clients;
   configure the domain name associated with the network site to point to the proxy server application in response to a first determination that the client is authorized to configure the domain name;
   obtain a first identification of a first portion of the network site from the client, the first identification including a first uniform resource locator (URL);
   configure the proxy server application associated with the network site to obtain the first portion of the network site from a first electronic commerce application hosted within a first network in response to a second determination that the client is authorized to configure the proxy server application associated with the network site;
   obtain a second identification of a second portion of the network site from the client, the second identification including a second URL;
   configure the proxy server application associated with the network site to obtain the second portion of the network site from a second electronic commerce application hosted within a second network in response to the second determination that the client is authorized to configure the proxy server application associated with the network site; and
   reconfigure the proxy server application associated with the network site to obtain the first portion of the network site from the second electronic commerce application, wherein the first URL is mapped to a third URL corresponding to the second electronic commerce application.

2. The non-transitory computer-readable medium of claim 1, wherein the first URL includes a filename, the third URL includes another filename, and the filename is different from the another filename.

3. A system, comprising:
   at least one computing device; and
   a network site configuration application executable in the at least one computing device, the network site configuration application comprising a plurality of machine-readable instructions that cause the at least one computing device to at least:
      authenticate one a plurality of user accounts, wherein individual ones of the plurality of user accounts are exclusively authorized to configure respective ones of a plurality of network sites after the individual ones of the user accounts have been authenticated;
      obtain a first identification of a first network page associated with at least one of the plurality of network sites, wherein the at least one of the plurality of network sites is associated with the authenticated one of the plurality of user accounts;
      configure a proxy server application to obtain the first network page from a network page server application executed in the at least one computing device within an untrusted network that is separated from a trusted network by a firewall;
      obtain a second identification of a second network page associated with the at least one of the plurality of network sites; and
      configure the proxy server application to obtain the second network page from an application executed in at least one other computing device within the trusted network.

4. The system of claim 3, wherein a domain name associated with the at least one of the plurality of network sites is mapped to the proxy server application.

5. The system of claim 3, wherein a domain name associated with the first network page is mapped to the proxy server application.

6. The system of claim 3, wherein the application executed in the at least one other computing device comprises a first electronic commerce application, and the network page server application comprises a second electronic commerce application.

7. The system of claim 3, wherein the application executed in the at least one other computing device is configured to accept an electronic payment.

8. The system of claim 3, wherein the first identification of the first network page and the second identification of the second network page comprise a respective uniform resource locator (URL).

9. The system of claim 8, wherein the proxy server application is configured to translate the URL corresponding to the second network page into a different URL based at least in part on a data dictionary lookup function.

10. The system of claim 3, wherein the first identification of the first network page includes a regular expression.

11. The system of claim 3, wherein the proxy server application comprises a hypertext transfer protocol (HTTP) proxy server application.

12. A method, comprising:
   authenticating, in at least one computing device, an administrator account of a network site, wherein the administrator account is one of a plurality of administrator accounts and the network site is one of a plurality of network sites and individual ones of the plurality of administrator accounts are exclusively authorized to configure individual ones of the plurality of network sites;

obtaining, in the at least one computing device, a first request from the administrator account of the network site to configure a proxy server application to obtain at least one network page associated with a first portion of the network site from a first application executed in at least one computing device;

configuring, in the at least one computing device, the proxy server application in accordance with the first request in response to authenticating the administrator account, wherein the proxy server application is configured via a control panel provided by the at least one computing device to the plurality of administrator accounts, wherein the control panel permits the individual ones of the plurality of administrator accounts to configure the proxy server application with respect to the individual ones of the plurality of network sites;

obtaining, in the at least one computing device, a second request from the administrator account to reconfigure the proxy server application to obtain the at least one network page associated with the first portion of the network site from a second application executed in at least one computing device, wherein the network site comprises one of a plurality of network sites hosted at least in part through the second application; and reconfiguring, in the at least one computing device, the proxy server application in accordance with the second request in response to authenticating the administrator account.

13. The method of claim 12, further comprising reconfiguring, in the at least one computing device, the proxy server application to obtain the at least one network page associated with the first portion of the network site from the first application based at least in part on a saved configuration.

14. The method of claim 12, further comprising configuring, in the at least one computing device, the proxy server application to obtain at least one network page associated with a second portion of the network site from the second application.

15. The method of claim 12, further comprising:
obtaining, in the at least one computing device, a specification of at least one uniform resource locator (URL) corresponding to the first application, the specification including at least one regular expression; and configuring, in the at least one computing device, the proxy server application to translate the at least one URL into a different at least one URL corresponding to the second application.

16. The method of claim 12, further comprising determining, in the at least one computing device, a set of uniform resource locators (URLs) corresponding to the first portion of the network site.

17. The method of claim 16, further comprising configuring, in the at least one computing device, the proxy server application to translate each URL in the set of URLs into a corresponding URL in another set of URLs that is associated with the second application.

18. The method of claim 16, wherein the set of URLs are automatically determined based at least in part on a plurality of requests for network pages of the network site.

19. The method of claim 12, wherein the first application corresponds to a first electronic commerce application and the second application corresponds to a second electronic commerce application.

20. The method of claim 19, wherein the second electronic commerce application is configured to process an electronic payment associated with at least one of a plurality of entities.

21. The method of claim 12, wherein the second application is executed within a trusted network that is separated from an untrusted network by a firewall, and the first application is executed within the untrusted network.

22. The method of claim 21, wherein the proxy server application is executed in the untrusted network.

23. The method of claim 21, wherein the proxy server application is executed in the trusted network in a demilitarized zone.

24. The method of claim 12, further comprising configuring, in the at least one computing device, a domain name associated with the network site to point to the proxy server application.

25. The method of claim 12, the proxy server application comprises a hypertext transfer protocol (HTTP) proxy server application.

* * * * *